(12) United States Patent
Brunner et al.

(10) Patent No.: US 11,231,338 B2
(45) Date of Patent: Jan. 25, 2022

(54) DIFFERENTIAL PRESSURE SENSOR DEVICE HAVING CHANNEL IN FLUID COMMUNICATION WITH A VENT HOLE

(71) Applicant: TE Connectivity Solutions GmbH, Steinach (CH)

(72) Inventors: Ismael Brunner, Bevaix (CH); Thomas Arnold, Le Landeron (CH); Predrag Drljaca, Neuchâtel (CH); Jean-Francois Le Néal, Neuchâtel (CH); Jean-Luc Billod, Bevaix (CH)

(73) Assignee: TE CONNECTIVITY SOLUTIONS GMBH, Steinach (CH)

( * ) Notice: Subject to any disclaimer, the term of this patent is extended or adjusted under 35 U.S.C. 154(b) by 174 days.

(21) Appl. No.: 16/677,548

(22) Filed: Nov. 7, 2019

(65) Prior Publication Data
US 2020/0158587 A1    May 21, 2020

(30) Foreign Application Priority Data
Nov. 15, 2018  (EP) ..................... 18206582

(51) Int. Cl.
*G01L 9/00*    (2006.01)
*G01L 19/14*   (2006.01)
*G01L 19/06*   (2006.01)

(52) U.S. Cl.
CPC .......... *G01L 9/0075* (2013.01); *G01L 19/148* (2013.01); *G01L 19/0627* (2013.01)

(58) Field of Classification Search
None
See application file for complete search history.

(56) References Cited

U.S. PATENT DOCUMENTS

| | | | |
|---|---|---|---|
| 9,976,922 B2 * | 5/2018 | Plochinger | G01L 19/04 |
| 2006/0260409 A1 * | 11/2006 | Yane | G01L 9/0072 73/715 |
| 2007/0227254 A1 * | 10/2007 | Nagasawa | G01L 9/0073 73/724 |
| 2011/0036174 A1 * | 2/2011 | Hooper | B81B 7/0061 73/721 |
| 2017/0131168 A1 * | 5/2017 | Shimoyama | G01L 9/0054 |
| 2018/0058963 A1 * | 3/2018 | Wagner | G01L 9/0054 |

* cited by examiner

*Primary Examiner* — Andre J Allen
*Assistant Examiner* — Jermaine L Jenkins (57) ABSTRACT

The present invention relates to a differential pressure sensor device, comprising a substrate, another layer formed on a main surface of the substrate and a first cavity and a second cavity separated from each other by a membrane. The first cavity is in fluid communication with a channel that is in fluid communication with a vent hole through which air can enter from an environment of the sensor device. The channel extends within the other layer or the substrate in a plane that is substantially parallel to the main surface.

15 Claims, 5 Drawing Sheets

DIFFERENTIAL PRESSURE SENSOR DEVICE HAVING CHANNEL IN FLUID COMMUNICATION WITH A VENT HOLE

CROSS-REFERENCE TO RELATED APPLICATIONS

This patent application claims the benefit of European Patent Application No. 18206582.1 filed on Nov. 15, 2018, which patent application is hereby incorporated by reference in its entirety.

FIELD

The present invention relates to a differential pressure sensor device and, in particular, to a differential pressure sensor device comprising a substrate and another layer comprising channels, and the invention, furthermore, relates to a method of manufacturing such a device.

BACKGROUND

Differential pressure sensors measure a difference in pressure between two isolated liquids or gasses. A differential pressure sensor (or transducer) converts a difference in pressure of the liquids or gases to an electrical signal that can be measured to determine the differential pressure value. Generally, there are three different transduction mechanisms used to measure pressure such as piezoresistive, piezoelectric, and capacitive. A pressure-sensing device of the sensor is typically manufactured by Micro-Electro-Mechanical System (MEMS) techniques. This technology is used to manufacture commercial semiconductors along with etching and bonding techniques to fabricate very small, inexpensive devices that convert differential pressure to an electrical signal.

Conventionally, when manufacturing a capacitive or resistive differential pressure sensor a pressure-sensing die is formed from a semiconductor material such as silicon. The die is formed from a silicon wafer by methods such as dicing to produce a silicon structure, which is thinned to create a cavity and define an associated diaphragm. In an example, piezoresistive elements are formed or placed at the surface of the diaphragm and are configured to exhibit resistance that is proportional to the strain placed on the thinned semiconductor material forming the diaphragm. An electrical circuit connected to the piezoresistive elements creates an electrical signal, based in part on the resistance value of the piezoresistive elements (typically forming a network of Wheatstone bridges). Accordingly, the electrical signal is representative of the pressure of the media under test.

In a particular class of differential pressure sensors, that are also called gauge type pressure sensors, on one side of the diaphragm (membrane) a pressurized liquid or gas type medium that has to be measured is supplied whereas the other side of the membrane is open to the atmosphere. Thus, the pressure of a test medium is measured against the atmospheric pressure. The connection to the atmosphere is generally called a vent or ventilation hole. Since the sensor has a vent hole to allow it to sense atmospheric pressure, the vent hole has to be kept unblocked at all times.

Figure 1:
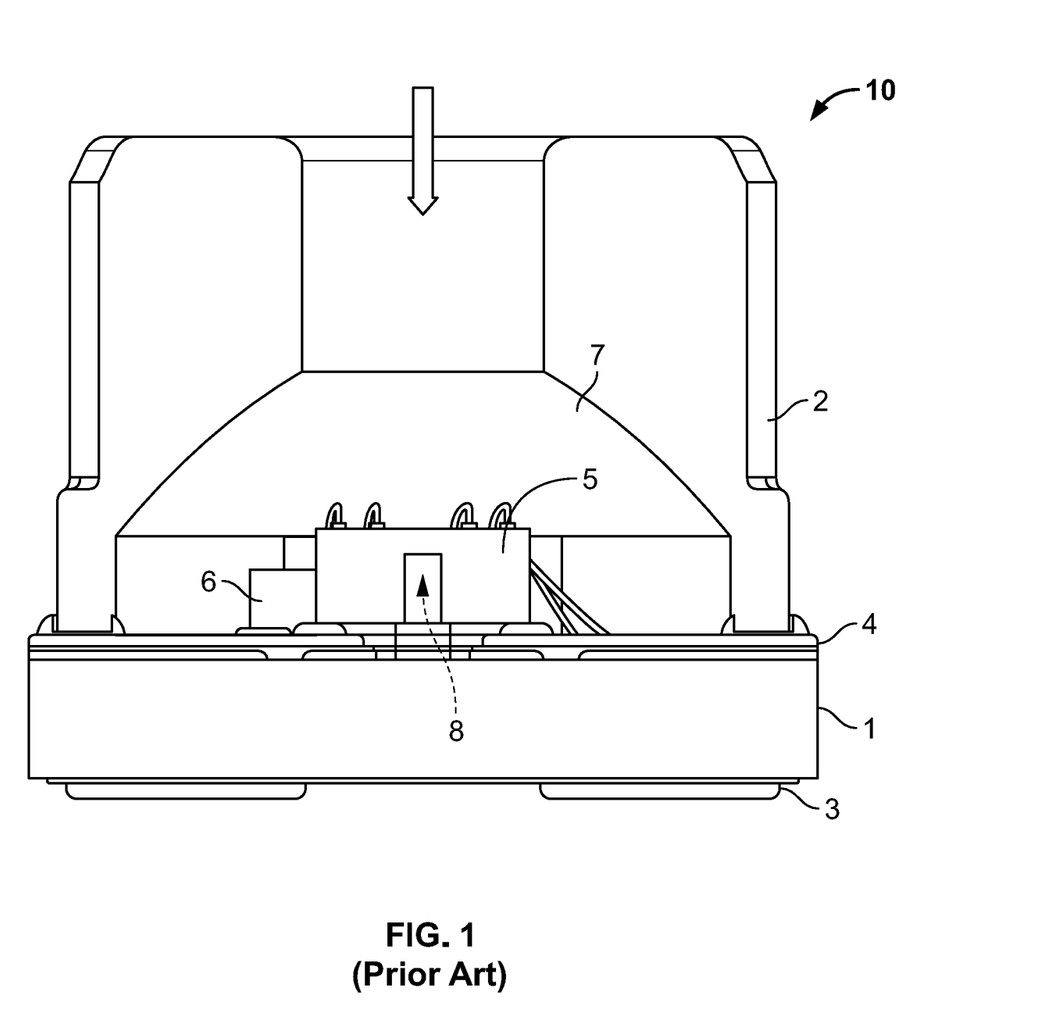
FIG. 1 schematically illustrates a differential pressure sensor device according to an example of the prior art.

FIG. 1 shows an example of such a differential pressure sensor 10 having a vent hole as known in the art. As shown in FIG. 1 the sensor 10 has a substrate 1 and a housing 2. Surface Mounted Device (SMD) contact pads 3 are provided at the bottom of the substrate 1 for contacting a mounting PCB. Another layer (for example, a dielectric layer) 4 on which an electrically conductive pattern can be provided is formed on the substrate 1. Over the dielectric layer 4, a microelectromechanical system (MEMS) 5 and an Application Specific Integrated Circuit (ASIC) 6 are formed. The sensing membrane is formed on or by the MEMS top surface. A gel protection 7 is positioned horizontally in the housing 2.

The pressure of a fluid (liquid or gas) entering from the top (see broad arrow pointing downwards) can be measured against atmospheric pressure built up by an airflow (see thin arrow pointing upwards) through a vent hole 8 formed through in the bottom surface of the substrate 1 (and positioned between the contact pads 3) and connected to a channel extending from the vent hole 8 through the substrate 1 and the dielectric layer 4 to a cavity wherein the atmospheric pressure is built up. However, when the sensor 10 is mounted on a printed circuit board (PCB) for completing the manufacture of an operable device there is a risk of clogging the vent hole. Furthermore, there has to be provided for a corresponding through hole in the PCB communicating with the environment and the vent hole of the sensor 10. This through hole formed in the PCB might also be inadvertently blocked, for example, by solder or some conformal coating.

In view of the above, it is an object of the present invention to provide a differential pressure sensor device wherein the atmospheric pressure can be built up and maintained in a more reliable manner as compared to the art.

SUMMARY

The present invention addresses the above-mentioned problem by providing a differential (for example, a gauge) pressure sensor device, comprising a substrate (for example, a multi-layer or bulk ceramic substrate), another layer formed on a main (top) surface of the substrate and a first cavity and a second cavity separated from each other by a membrane. The substrate can be some semiconductor substrate or a high or low temperature co-fired ceramic, for example. Also, a printed circuit board is covered by this term, in general. The other layer can be a dielectric layer and can also be a layer formed of the same material as the substrate. The first cavity is in fluid (liquid or gas) communication with at least one channel that is in fluid communication with a vent hole through which air (or different gas) can enter from an environment of the sensor device (from some reference pressure reservoir or air at atmospheric pressure).

The at least one channel extends within the other layer or the substrate in a plane that is substantially parallel to the main surface. The at least one channel may also reach a top surface of the substrate and or the other layer. In particular, the substrate can be a multi-layer substrate comprising a plurality of sub-layers and the at least one channel, in this case, may be formed in one of the plurality of sub-layers of the substrate. In particular, the other layer, for example, a dielectric layer, can be a multi-layer layer comprising a plurality of sub-layers and the at least one channel, in this case, may be formed in one of the plurality of sub-layers of the other layer.

By the provision of the vent hole and the channel, for example, atmospheric pressure can be built up and maintained in the first cavity. This allows for measuring the pressure of a test medium supplied from a reservoir through another channel into the second cavity against atmospheric pressure. It should be noted that here and in the following description no restriction to atmospheric pressure is necessary. In fact, the atmospheric pressure can be replaced by any reference pressure supplied by a corresponding reference pressure reservoir.

The pressure difference is sensed by the membrane. Resistors, for example piezoresistive elements, that may form a network of Wheatstone bridges may be formed on a surface of the membrane. Each of the resistors has a resistance that varies with variations of an applied strain. The differential pressure sensor device may further comprise a MEMS for generating an electrical signal indicative of pressure variations as sensed by the membrane and an ASIC for further processing the electrical signal, wherein the ASIC and the MEMS are formed over the main surface of the substrate.

Contrary, to the art, a channel connecting the first cavity with the environment (for example, being at atmospheric pressure) via the vent hole is formed in a plane that is parallel to the main surface which implies that the vent hole is not formed in the bottom surface of the substrate (opposite to the main (top) surface). Thereby, the risk of clogging of the vent hole is significantly decreased as compared to the art. In fact, the distance of the vent hole from the mounting surface of the substrate, i.e., the bottom surface, can be arbitrarily chosen along the thickness (vertical) direction of the stack of the substrate and the other layer in a direction perpendicular to the main surface and this distance can be chosen to be sufficiently high in order to prevent clogging by some conformal coating of a mounting PCB to which the substrate may be mounted. No through hole corresponding to the venting hole has to be formed in the mounting PCB at all. Thereby, space is saved since the footprint on the other side of the board is reduced.

The above-mentioned problem is also solved by a method of manufacturing a differential (gauge) pressure sensor device, wherein the method comprises the following steps:

forming a substrate (for example made of or comprising a ceramic material or a PCB);

forming another layer (that, for example, can be formed of a dielectric material or of the same material as the substrate) on a main (top) surface of the substrate;

forming at least one channel in the other layer or the substrate in a plane parallel to the main surface of the substrate such that the channel forms a vent hole in a minor surface (orientated perpendicular to the main surface) of the other layer or the substrate that is orientated perpendicular to the main surface of the substrate; and forming a through passage (for example, in a plane perpendicular to the main surface) through the other layer and connecting to the channel. The through passage also connects to a cavity wherein some reference pressure has to be built up.

A sensor cell can be formed over the other layer and the substrate. The sensor cell comprises a first cavity for providing for a reference pressure. Thus, the above-mentioned method may comprise forming a first cavity over the other layer by forming a membrane over the other layer, wherein the through passage is formed such that it connects to the first cavity in order to allow built up of a reference pressure (for example, atmospheric pressure) through the vent hole (and the at least one channel). A plurality of resistors, in particular, a plurality of piezoresistive elements, may be formed on a surface of the membrane in order to manufacture a resistive differential pressure sensor device.

If the vent hole is formed in the other layer, the forming of the other layer may comprise forming a first dielectric sub-layer on the substrate (a single-layer or multi-layer substrate), forming a second dielectric sub-layer partially comprising a sacrificial material or forming a sacrificial layer made of a sacrificial material adjacent to a second dielectric sub-layer on the first dielectric sub-layer and forming a third dielectric sub-layer on the second dielectric sub-layer partially comprising the sacrificial material or on both the sacrificial layer made of the sacrificial material and the adjacent second dielectric sub-layer. In this case, the formation of the channel comprises removing the sacrificial material, for example, by carrying out an anneal process, after the formation of the third dielectric sub-layer.

If the vent hole is formed in the substrate, the forming of the substrate may comprise forming a first substrate sub-layer, forming a second substrate sub-layer partially comprising a sacrificial material or forming a sacrificial layer made of a sacrificial material adjacent to a second substrate sub-layer on the first substrate sub-layer and forming a third substrate sub-layer on the second substrate sub-layer partially comprising the sacrificial material or on both the sacrificial layer made of the sacrificial material and the adjacent second substrate sub-layer. In this case, the formation of the channel comprises removing the sacrificial material, for example, by carrying out an anneal process, after the formation of the third substrate sub-layer.

Alternatively, a channel or a plurality of channels are formed in the substrate or the other layer without the formation of a sacrificial material but rather by laser etching, chemical etching, sawing, etc.

According to an embodiment, a MEMS or another pressure sensing element and an ASIC and a membrane are formed over the other layer and a housing is provided that may partially form the above-mentioned first cavity below (in the direction to the other layer) the membrane and a second cavity above the membrane wherein the second cavity is provided for accommodating a test medium the pressure of which is to be measured against the reference pressure built up in the first cavity. Moreover, a printed circuit board can be bonded to another main (bottom) surface of the substrate that is opposite to the main (top) surface and can be provided with appropriate contact pads.

Additional features and advantages of the present invention will be described with reference to the drawings. In the description, reference is made to the accompanying figures that are meant to illustrate preferred embodiments of the invention. It is understood that such embodiments do not represent the full scope of the invention.

DETAILED DESCRIPTION

Figure 2:
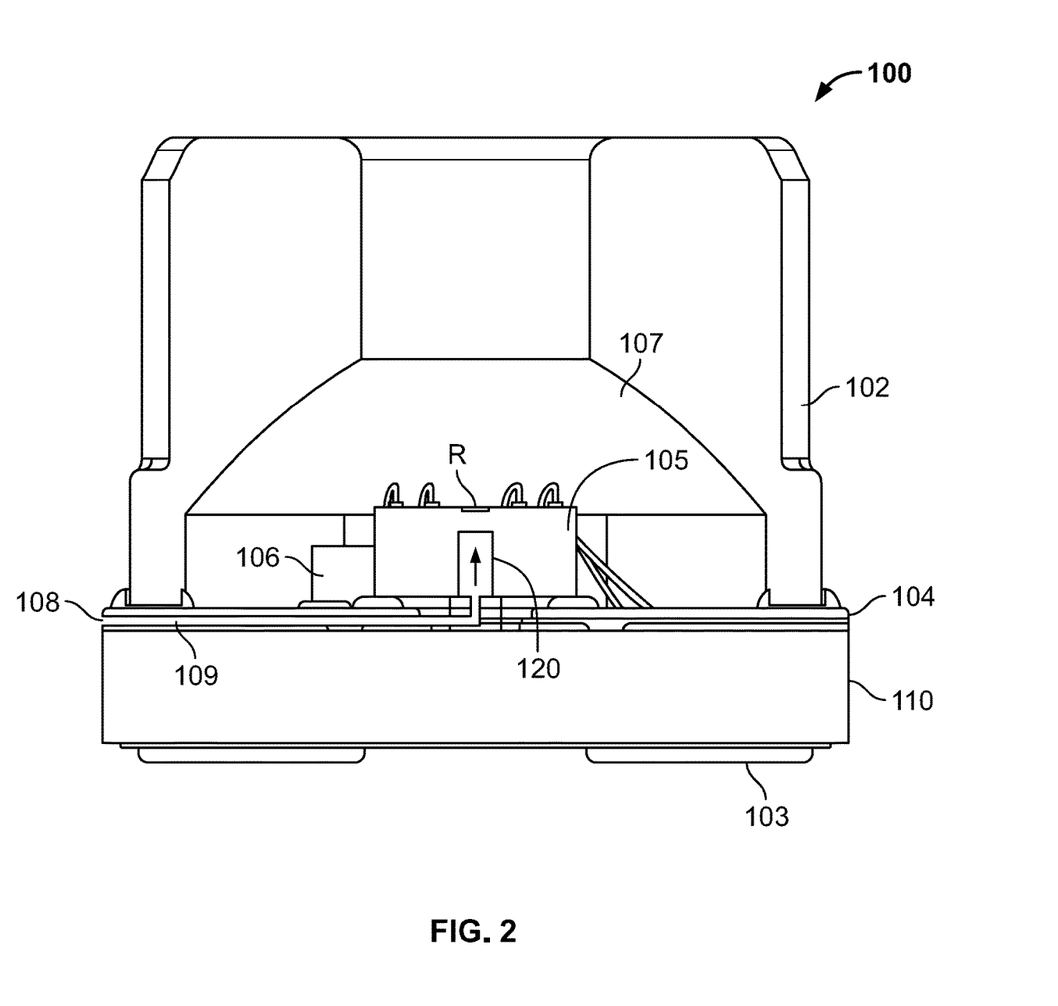
FIG. 2 illustrates a differential pressure sensor device with one or more channels formed in another layer according to an embodiment of the present invention.

The present invention provides a differential pressure sensor device, for example, a differential pressure sensor device wherein pressure of a test medium is measured against some reference pressure, for example, against atmospheric pressure (gauge pressure sensor device). An embodiment of the inventive differential pressure sensor device 100 is illustrated in FIG. 2. The differential pressure sensor device 100 comprises a substrate 110 and a housing 102.

The substrate 110 may be made of a ceramic material, in particular, an electronically conductive ceramic material. Doped zirconium oxides (e.g., doped with yttrium and/or samarium and/or scandium) and/or doped ceroxides (e.g., doped with gadolinium and/or scandium) are examples for the ceramic material. Other metals, in particular copper, cobalt and/or other transition metals and/or metal alloys may be contained.

The housing 102 may be made of materials such as silicon or other semiconductor materials, glass, metal, plastic, ceramic as well as other suitable materials. A seal may be formed at the upper surface of the housing 102 and the underside of substrate 110 using an O-ring seal, for example. The housing 102 may be attached to the substrate 110 via some adhesive, solder or glass frit.

Another layer 104 is formed on a top main surface (orientated in the horizontal direction in FIG. 2) of the substrate 110. The other layer 104 may, for example, be made of or comprise a dielectric, for example, some oxide material. Contact pads 103 for electrically contacting a mounting PCB are formed on a main bottom surface of the substrate 110.

An MEMS 105 and an ASIC 106 are provided in the housing 102 above the top main surface of the substrate 110 and the dielectric layer 104. A sensing membrane is formed on or by a top surface of the MEMS. A gel protection 107 is, furthermore, provided in the housing 102 and separates two cavities from each other. For example, the flexible membrane that contacts the measured media may comprise stainless steel. The flexible membrane is configured to flex when the resulting net pressure difference of the media exerts a force to the surface of the flexible membrane. Resistors R, for example piezoresistive elements, that may form a network of Wheatstone bridges may be formed on a surface of the membrane.

By applying a first pressure to a first surface of the membrane, while simultaneously applying a second pressure to a second surface of the membrane opposite the first surface the membrane will experience a force that is representative for the net pressure difference between the pressures applied to the first and second surfaces. The piezoresistive elements will exhibit a resistance representative of this net pressure difference applied to the membrane. The MEMS 105 outputs electrical signals indicative of pressure variations sensed by the (resistors of the) membrane to the MEMS ASIC 106. The ASIC 106 may process the electrical signals for analog to digital conversion and/or amplification, noise filtering, etc., as desired. The housing 102 may include other pressure sensor components, such as, oil-filled isolated volumes which prevent harsh media whose pressure is being measured from coming into contact with the sensitive membrane and the ASIC 106 and the MEMS 105. Protection can also be provided by some appropriate coating.

A vent hole 108 is formed in the other layer 104 and connected by a channel or a plurality of channels 109 that extends horizontally in FIG. 2 and connects to an inlet 120. The channel(s) 109 is (are) formed within the dielectric layer 104 in a plane that is substantially parallel to the main top surface of the substrate 110 on which the dielectric layer 104 is formed. The channel(s) 9 is (are) in fluid communication with the vent hole 108 and the inlet 120. Thereby, an atmospheric pressure can be built up (see arrow in FIG. 2) and maintained in the lower one of the cavities partially built by the membrane, if the vent hole 108 represents an inlet to natural environment. Alternatively, any reservoir providing any reference pressure different from atmospheric pressure can be connected to the vent hole 108.

Figure 3:
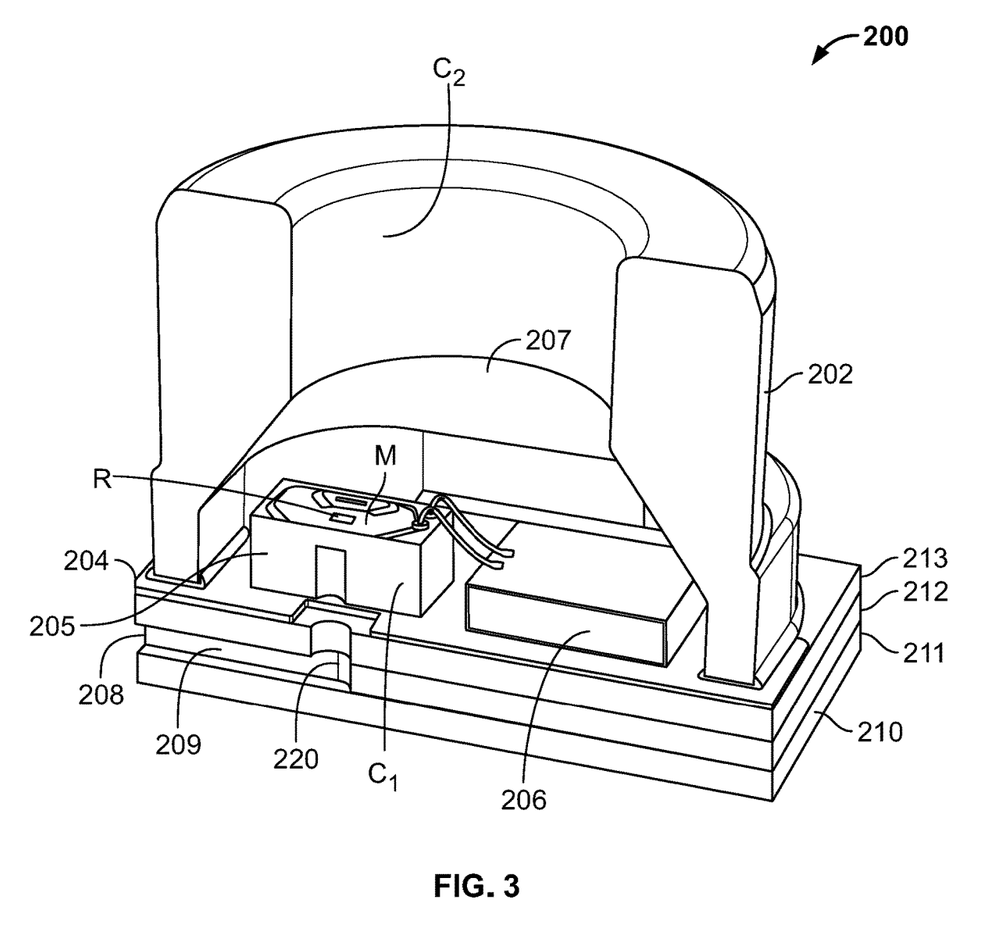
FIG. 3 illustrates a differential pressure sensor device with one or more channels formed in a substrate according to another embodiment of the present invention.

FIG. 3 illustrates an alternative embodiment of the inventive differential pressure sensor device 200. The differential pressure sensor device 200 comprises a multi-layer substrate 210 including at least three sub-layers 211, 212 and 213 and a housing 202. Another layer 204 (for example, a dielectric layer) is formed on the multi-layer substrate 210. The housing 202 houses a MEMS 205, an ASIC 206 and a gel protection 207. Materials of the various components can be chosen similar to the ones mentioned above in the context of the description of the embodiment shown in FIG. 2. Resistors R, for example piezoresistive elements, that may form a network of Wheatstone bridges may be formed on a surface of the membrane M formed on or by a top surface of the MEMS 205. The membrane M separates a first cavity $C_1$ from a second cavity $C_2$. A test (measuring) medium may be introduced in the second cavity $C_2$ and the pressure of the test medium may be measured against the pressure of a reference medium introduced into the first cavity $C_1$. The reference medium may be air with atmospheric pressure.

Different from the embodiment shown in FIG. 2 one or more channels 209 are formed in one or more of the sub-layers 211, 212, 213 of the substrate 210 in a plane that is parallel to a top main surface of the substrate 210 and connected to an inlet 220. Moreover, the channel(s) 209 is (are) connected to a vent hole 208 that is formed in a minor surface (orientated perpendicular to the main surface) of the substrate 210. If the vent hole 208 is directed to a natural environment atmospheric pressure can be built up and maintained in the first cavity $C_1$.

In the above-described embodiments, a vent hole and one or more channels connected to the vent hole and extending parallel to the top main surface of the substrate are provided in a manner that avoids or at least reduces the risk of clogging of the vent hole. In the following, exemplary procedures for manufacturing the differential pressure sensor device, for example, one of the differential pressure sensor devices 100 and 200 shown in FIG. 2 and FIG. 3, respectively, are described with reference to FIGS. 4 and 5.

Figure 4:
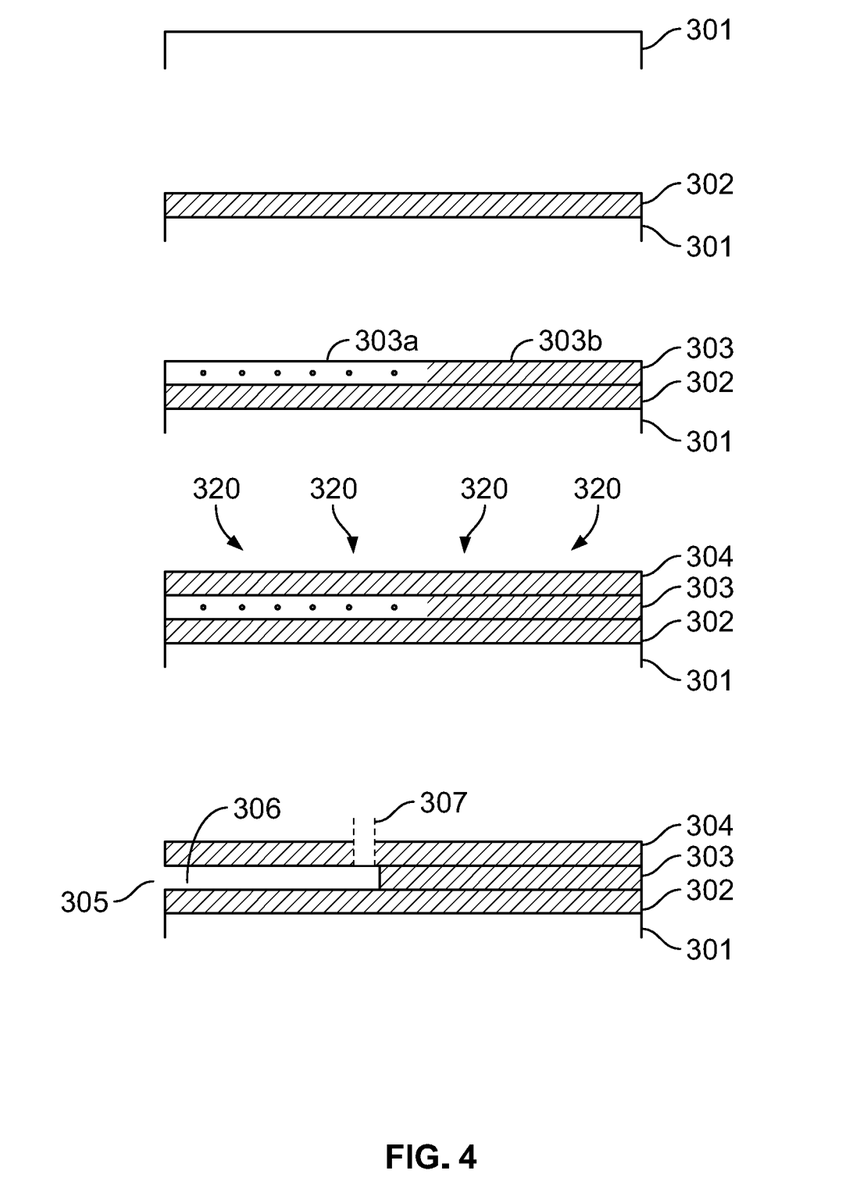
FIG. 4 shows steps of manufacturing of a differential pressure sensor device wherein a vent hole is formed in another layer.
Figure 5:
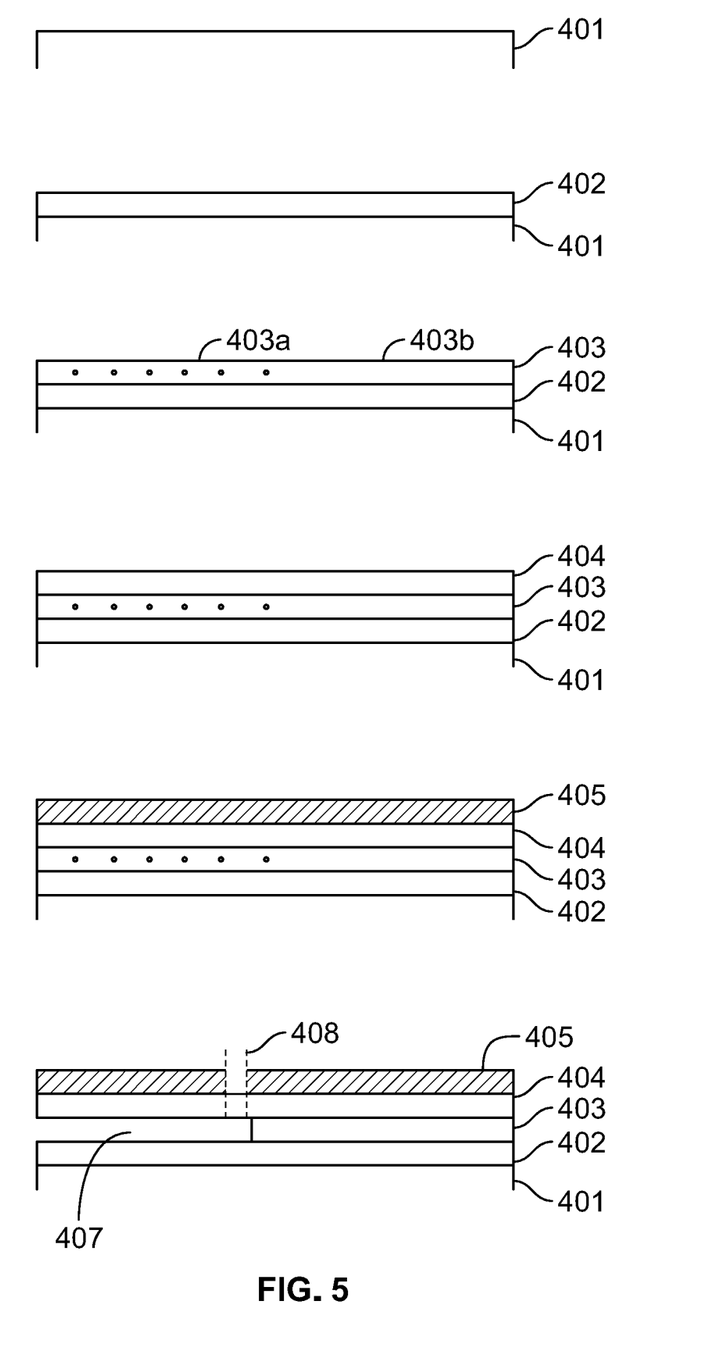
FIG. 5 shows steps of manufacturing of a differential pressure sensor device wherein a vent hole is formed in a substrate.

The differential pressure sensor device according to embodiments of the present invention comprises a substrate and another layer formed on the substrate. Active components of the differential pressure sensor device are formed over the substrate and the dielectric layer. In the following description, it is assumed that the other layer is a dielectric layer for exemplary purposes. In FIG. 4 it is shown the formation of a multi-layer stack comprising a substrate and a dielectric layer formed on the substrate wherein a vent hole for providing a reference pressure is formed in the dielectric layer. In FIG. 5 it is shown the formation of a multi-layer stack comprising a substrate and another layer formed on the substrate wherein a vent hole for providing a reference pressure is formed in the substrate.

In the embodiment illustrated in FIG. 4 a substrate 301 is provided (see top row of FIG. 4). The substrate 301 may comprise or consist of a ceramic material, in particular, an electronically conductive ceramic material. Doped zirconium oxides (e.g., doped with yttrium and/or samarium and/or scandium) and/or doped ceroxides (e.g., doped with gadolinium and/or scandium) are examples for the ceramic material. Other metals, in particular copper, cobalt and/or other transition metals and/or metal alloys may be contained. The substrate 301 may be provided in the form of a bulk substrate or a multi-layer substrate.

In the manufacturing step shown in the second row from top in FIG. 4 a dielectric layer 302 is formed on the substrate 301. The dielectric layer 302 may be some oxide layer. As shown in the third row from the top in FIG. 4 a partial sacrificial layer 303 is formed on the dielectric layer 302. The partial sacrificial layer 303 comprises a portion of a sacrificial material 303a (indicated by the dots in FIG. 4) that will be removed during the further proceedings. In particular, the partial sacrificial layer 303 comprises a material that will be removed and extends to an edge (on the left-hand side in the configuration shown in FIG. 4) of the multi-layer stack. The sacrificial material may be formed by an appropriate doping or adaptation of depositing parameters. According to an embodiment, forming the partial sacrificial layer 303 comprises forming a layer of a sacrificial material 303a on the dielectric layer 302 and forming adjacent to that layer 303a another layer 303b of a dielectric material on the dielectric layer 302.

Subsequently, another dielectric layer 304 is formed on the partial sacrificial layer 303 (see the penultimate row in FIG. 4). Additionally, layers may be formed on and over the other dielectric layer 304.

At some stage of the overall manufacturing process, sacrificial material of the partial sacrificial layer 303 is removed (see the last row of FIG. 4). For example, removal of the sacrificial material can be achieved by some heating/(short time) annealing procedure 320. The sacrificial material may be removed during curing of the (for example, ceramic) substrate 301. By removal of the sacrificial material of the partial sacrificial layer 303 a vent hole 305 and a channel 306 are formed. It goes without saying that any (and, in particular, more than one) of the dielectric sub-layers can be provided with a sacrificial material.

It is noted that one or more channels may be formed by an appropriate selection of the sacrificial material. In a later stage of the overall manufacturing process, a through passage 307 is formed through overlaying layers (for example, through dielectric layer 304) to the one or more channels 306. Regarding the used terminology here and in the following, the through passage 307 connecting to the channel(s) can also be considered being part of a channel that is connected to the vent hole (here vent hole 305). By means of the through passage, the channel(s) 306 and the vent hole 305 a reference pressure can be built up in a cavity of the pressure sensor device wherein a pressure is provided against which the pressure of a test medium can be determined.

Subsequently, other components of the differential pressure sensor device are formed over the dielectric layer 304 (see FIG. 2).

FIG. 5 illustrates the steps of an alternative manufacturing process. A first layer 401 of a substrate is provided (see top row of FIG. 5). The substrate may comprise or consist of a ceramic material, in particular, an electronically conductive ceramic material. Doped zirconium oxides (e.g., doped with yttrium and/or samarium and/or scandium) and/or doped ceroxides (e.g., doped with gadolinium and/or scandium) are examples for the ceramic material. Other metals, in particular copper, cobalt and/or other transition metals and/or metal alloys may be contained. The substrate is provided in form of a multi-layer substrate.

A second layer 402 of the substrate is formed on the first layer 401 in the manufacturing stage shown in the second row from the top of FIG. 5. Subsequently, another layer 403 is formed on layer 402 (see the third row from the top of FIG. 5). Partial sacrificial layer 403 comprises a sacrificial material, for example, formed by doping, indicated by the dots in FIG. 5. According to an embodiment, forming the layer 503 comprises forming a layer of a sacrificial material 403a on the layer 402 and forming adjacent to that layer 403a another layer 403b of a substrate material on the layer 402. The sacrificial material of the substrate will be removed in a later stage of the overall manufacturing process.

In a further developed manufacturing stage, another layer 404 of the substrate is formed on the layer 403 comprising the sacrificial material (see the fourth row from the top of FIG. 5). Subsequently, a dielectric layer 405 is formed on the layer 404. The dielectric layer 405 may be a single-layer or a multi-layer layer.

At some stage of the overall manufacturing process, the sacrificial material of the partial sacrificial layer 403 is removed (see the last row of FIG. 5). For example, removal of the sacrificial material can be achieved by some heating/(short time) annealing procedure. The sacrificial material may be removed during curing of the (for example, ceramic) substrate. By removal of the sacrificial material of the partial sacrificial layer 403 a vent hole 406 and a channel 407 are formed. It goes without saying that any (and, in particular, more than one) of the sub-layers of the substrate can be provided with a sacrificial material.

It is noted that one or more channels may be formed by an appropriate selection of the sacrificial material. In a later stage of the overall manufacturing process, a through passage 408 is formed through the dielectric layer 405 and the layer 404 to the one or more channels 407. By means of the through passage 408, the channel(s) 407 and the vent hole 406 a reference pressure can be built up in a cavity of the pressure sensor device wherein a pressure is provided against which the pressure of a test medium can be determined.

While embodiments of the present disclosure have been described as utilizing, for example, piezoresistive elements to detect the strain of a pressure-sensing diaphragm, it should be understood that any suitable type of pressure-sensing technology may be implemented without departing from the scope of the present disclosure. A sensing element is not necessarily provided by means of a MEMS. Other examples cover a ceramic membrane. For example, pressure sensor devices disclosed herein may implement capacitive, electromagnetic, piezoelectric, optical or thermal pressure-sensing techniques, as will be understood by a person skilled in the art.

All previously discussed embodiments are not intended as limitations but serve as examples illustrating features and advantages of the invention. It is to be understood that some or all of the above-described features can also be combined in different ways.

What is claimed is:

1. A differential pressure sensor device comprising:
   a substrate comprising a bottom main surface disposed along a bottom portion the device;
   a layer formed above the substrate on a top main surface of the substrate opposite the bottom main surface;
   a first cavity and a second cavity separated from each other by a membrane that is disposed on a top surface of the layer; and
   a housing that is attached with the layer and extends upwardly away from layer and the top main surface of the substrate, wherein the membrane is disposed within the housing;
   wherein the first cavity is in fluid communication with a channel that is in fluid communication with a vent hole configured to be in fluid communication with a reference pressure medium external to the device, wherein the channel extends within the layer or the substrate in a plane that is substantially parallel to the main surface of the substrate.

2. The differential pressure sensor device according to claim 1, further comprising another channel in fluid communication with the second cavity and a reservoir of a test pressure medium.

3. The differential pressure sensor device according to claim 1, further comprising a printed circuit board bonded to the substrate bottom main surface.

4. The differential pressure sensor device according to claim 1 further comprising an Application Specific Integrated Circuit (ASIC) and/or a microelectromechanical system (MEMS) or another pressure sensing element, wherein the MEMS is configured to output electrical signals indicative of pressure variations sensed by the membrane to the ASIC and the ASIC is configured to process the electrical signals by amplification and/or analog-to-digital conversion and/or noise filtering.

5. The differential pressure sensor device according to claim 1, wherein a plurality of resistors comprising piezoresistive elements are formed on a surface of the membrane.

6. The differential pressure sensor device according to claim 1, wherein the reference pressure medium is atmospheric pressure, and wherein such atmospheric pressure can be built up in the first cavity.

7. The differential pressure sensor device according to claim 1, wherein the substrate is a multi-layer substrate comprising a plurality of sub-layers, and wherein the channel is formed in one of the plurality of sub-layers.

8. The differential pressure sensor device according to claim 1, wherein the layer on the top main surface of the substrate comprises a plurality of sub-layers, and wherein the channel is formed in one of the plurality of sub-layers.

9. A method of manufacturing a differential pressure sensor device comprising the steps of:
forming a substrate, wherein the substrate includes a top main surface and a bottom main surface that is opposite the top main surface, and wherein the substrate bottom main surface extends along a bottom portion of the device;
forming another layer on the substrate top main surface;
forming a channel in the other layer or the substrate in a plane parallel to the main surface of the substrate such that the channel forms a vent hole in a minor surface of the other layer or the substrate that is orientated perpendicular to the main surface of the substrate;
attaching a pressure sensing element comprising a membrane to a top surface of the other layer;
forming a through passage through the other layer and connecting to the channel; and
attaching a housing over the other layer and substrate top main surface such that the pressure sensing element is disposed within the housing, wherein the pressure sensing element comprises a membrane having a first surface and a second surface that is opposite the first surface.

10. The method according to claim 9, wherein a first cavity extends between the membrane first surface and the through passage, and wherein the first cavity is in fluid communication with the channel and vent hole to expose the membrane first surface to a reference pressure medium.

11. The method according to claim 9, wherein:
the channel is formed in the other layer;
the vent hole is formed in the minor surface of the other layer;
wherein forming the other layer comprises forming a first other sub-layer on the substrate;
forming either a second other sub-layer partially comprising a sacrificial material or a sacrificial layer comprising a sacrificial material adjacent to a second other sub-layer over the first other sub-layer and forming a third other sub-layer on the second other sub-layer partially comprising the sacrificial material or on both the sacrificial layer comprising the sacrificial material and the adjacent second other sub-layer; and
forming the channel in the other layer comprises removing the sacrificial material after the formation of the third other sub-layer.

12. The method according to claim 9, wherein:
the channel is formed in the substrate;
the vent hole is formed in the minor surface of the substrate;
forming the substrate comprises forming a first substrate sub-layer, forming either a second substrate sub-layer partially comprising a sacrificial material or a sacrificial layer comprising a sacrificial material adjacent to a second substrate sub-layer over the first substrate sub-layer and forming a third substrate sub-layer on the second substrate sub-layer partially comprising the sacrificial material or on both the sacrificial layer comprising the sacrificial material and the adjacent second substrate sub-layer; and
forming the channel in the substrate comprises removing the sacrificial material after the formation of the third substrate sub-layer.

13. The method according to claim 9 further comprising:
forming contact pads along the substrate bottom main surface;
bonding a printed circuit board to the substrate bottom main surface; and
forming an Application Specific Integrated Circuit (ASIC) and a microelectromechanical system (MEMS) over the other layer.

14. The method according to claim 9 further comprising forming a plurality of resistors comprising a plurality of piezoresistive elements on a surface of the membrane.

15. A differential pressure sensor device comprising:
a substrate;
a layer formed on a main surface of the substrate;
a first cavity and a second cavity separated from each other by a membrane; and
an Application Specific Integrated Circuit (ASIC) and/or a microelectromechanical system (MEMS) or another pressure sensing element, wherein the MEMS is configured to output electrical signals indicative of pressure variations sensed by the membrane to the ASIC and the ASIC is configured to process the electrical signals by amplification and/or analog-to-digital conversion and/or noise filtering;
wherein the first cavity is in fluid communication with a channel that is in fluid communication with a vent hole wherein the channel extends within the layer or the substrate in a plane that is substantially parallel to the main surface of the substrate.

\* \* \* \* \*